United States Patent
Orlova et al.

(10) Patent No.: US 9,248,427 B2
(45) Date of Patent: Feb. 2, 2016

(54) BIO-SAFE NANOCOMPOSITE POLYMER SORBENT FOR THE SELECTIVE BINDING OF SR AND CS ISOTOPES FROM LIQUID MEDIUM AND THE RAW MIXTURE FOR ITS PRODUCTION

(71) Applicants: Elena Vladimirovna Orlova, Moscow (RU); Evgeny Ilich Maevsky, Pushchino (RU); Vladimir Konstantinovich Klubkov, Moscow (RU); Aleksey Pavlovich Zelisko, Moscow (RU)

(72) Inventors: Elena Vladimirovna Orlova, Moscow (RU); Evgeny Ilich Maevsky, Pushchino (RU); Vladimir Konstantinovich Klubkov, Moscow (RU)

(73) Assignees: Elena Vladimirovna Orlova, Moscow (RU); Evgeny Ilich Maevsky, Pushchino (RU); Vladimir Konstantinovich Klubkov, Moscow (RU); Aleksey Pavlovich Zelisko, Moscow (RU)

( * ) Notice: Subject to any disclaimer, the term of this patent is extended or adjusted under 35 U.S.C. 154(b) by 0 days.

(21) Appl. No.: 14/432,435

(22) PCT Filed: Dec. 28, 2012

(86) PCT No.: PCT/RU2012/001142
§ 371 (c)(1),
(2) Date: Jul. 16, 2015

(87) PCT Pub. No.: WO2014/104919
PCT Pub. Date: Jul. 3, 2014

(65) Prior Publication Data
US 2015/0314265 A1    Nov. 5, 2015

(51) Int. Cl.
| | |
|---|---|
| *B01J 20/26* | (2006.01) |
| *B01J 20/24* | (2006.01) |
| *B01J 20/30* | (2006.01) |
| *B01J 20/22* | (2006.01) |

(52) U.S. Cl.
CPC ...... *B01J 20/24* (2013.01); *B01J 20/22* (2013.01); *B01J 20/262* (2013.01); *B01J 20/3085* (2013.01); *B01J 2220/44* (2013.01)

(58) Field of Classification Search
CPC .......... B01J 20/24; B01J 20/22; B01J 20/262; B01J 20/3085
USPC ........................................................ 502/402
See application file for complete search history.

(56) References Cited

U.S. PATENT DOCUMENTS

| | | | |
|---|---|---|---|
| 4,978,647 A | 12/1990 | Scott et al. | |
| 4,995,985 A | 2/1991 | Scott et al. | |
| 5,648,313 A | 7/1997 | Pohl | |
| 8,188,042 B1 | 5/2012 | Sung et al. | |
| 2010/0173772 A1 | 7/2010 | Robinson et al. | |

FOREIGN PATENT DOCUMENTS

IN         2007DE03599      *   6/2009

OTHER PUBLICATIONS

Todd et al. "Cesium and Strontium Separation Technologies Literature Review" Mar. 2004, Idaho National Engineering and Environmental Laboratory. INIS vol. 39, Issue 08.*
Search Report in PCT/RU2012/001142, dated Nov. 7, 2013.

* cited by examiner

*Primary Examiner* — Anthony J Zimmer
*Assistant Examiner* — Haytham Soliman
(74) *Attorney, Agent, or Firm* — Bardmesser Law Group

(57) ABSTRACT

A method for production of a bio-safe polymer sorbent for selective binding of Sr and Cs isotopes from a liquid medium for treatment of liquid radioactive wastes is provided. The sorbent with high specific sorption capacity in compliance with the requirements of bio-compatibility and safety with respect to the diverse biological objects, is produced. Also, a raw mixture used for the production of the sorbent has a small weight and a volume in comparison with the given sorbent. The structure of the sorbent is formed by self-assembly during the hydration of the dry mix of the components.

4 Claims, No Drawings

BIO-SAFE NANOCOMPOSITE POLYMER SORBENT FOR THE SELECTIVE BINDING OF SR AND CS ISOTOPES FROM LIQUID MEDIUM AND THE RAW MIXTURE FOR ITS PRODUCTION

CROSS-REFERENCE TO RELATED APPLICATION

This Application is a US National Phase of PCT/RU2012/001142 filed on Dec. 28, 2012.

BACKGROUND OF THE INVENTION

1. Field of the Invention

The invention is related to treatment of liquid radioactive wastes and, in particular, to a bio-safe polymer sorbent for selective binding of Sr and Cs isotopes from a liquid medium.

2. Description of the Related Art

Currently, there are several basic types of radionuclide sorbents in the form of a sorption matrix of inorganic salts—i.e., chelating agents such as tetraborates (RU Patent No. 2200994), acrylates (JP Patent No. 2005008753, 2005), acetates (RU Patent No. 2200994), silicates (RU Patent No. 2154317, RU Patent No. 2189650) and their zeolite modifications, strontium chelator based on the diaza-complex and silicic zeolite matrix developed by NIMS, Japan (National Institute for Materials Science) (http:**.nims.go.jp/eng/news/press/2011/07/p201107270.html), aluminum silicates, aluminum substituted alumen (RU Patent No. 2200994), orthophosphates (RU Patent No. 2200994).

The common drawback of the above mentioned compounds is the complexity of their synthesis, toxicity, and a relatively low sorptive capacity.

U.S. Pat. No. 4,995,985 describes a sorbent for the selective binding of Sr and Cs—propylene glycol alginate having, in the composition of a side chain, the polymer of gelatin, which is used as a ground for growing the bacterial culture, which is included in the sorbent. A disadvantage of the sorbent is that the distribution ratio of Sr and Cs between the phase with sorbent and the phase with deactivated water medium is 1371 and 103, respectively, and the coefficient value decreases sharply with the increase of the exposure time of the sorbent to the deactivated liquid medium, which indicates a weak binding of radio-nuclides. Another disadvantage is the lack of the specific capacity of the sorbent (i.e., a specific binding site—the larger the specific capacity, the better for the intended purpose).

Thus, the existing sorbents have insufficient sorption capacity. Moreover, they are not considered to be safe biocompatible substances, which limits their use not only in medicine, but also in biotechnology, as well as during purification of waste waters and other polluted waters that can absorb the residues of sorbent, which is unsafe for biological environment.

Accordingly, it is desired to provide a sorbent with high and specific sorption capacity in compliance with the requirements of biocompatibility and safety with respect to the diverse biological objects. It is also desired to produce a raw mixture for sorbent production.

SUMMARY OF THE INVENTION

Accordingly, the present invention is related to a method for treatment of liquid radioactive wastes and, in particular, to a bio-safe polymer sorbent for selective binding of Sr and Cs isotopes from a liquid medium that substantially obviates one or more of the disadvantages of the related art.

In one embodiment, a method for production of a bio-safe polymer sorbent for selective binding of Sr and Cs isotopes from a liquid medium for treatment of liquid radioactive wastes is provided. The sorbent with high specific sorption capacity in compliance with the requirements of bio-compatibility and safety with respect to the diverse biological objects, is produced.

Also, a raw mixture used for the production of the sorbent has a small weight and a volume in comparison with the given sorbent. The structure of the sorbent is formed by the self-assembly during the hydration of the dry mix of the components.

Additional features and advantages of the invention will be set forth in the description that follows, and in part will be apparent from the description, or may be learned by practice of the invention. The advantages of the invention will be realized and attained by the structure particularly pointed out in the written description and claims hereof.

It is to be understood that both the foregoing general description and the following detailed description are exemplary and explanatory and are intended to provide further explanation of the invention as claimed.

DETAILED DESCRIPTION OF THE PREFERRED EMBODIMENTS

Reference will now be made in detail to the preferred embodiments of the present invention.

The present invention is directed to a method for production of a sorbent with high specific sorption capacity complying to the requirements of bio-compatibility and safety with respect to the diverse biological objects. A raw mixture for production of the sorbent, which has a small weight and volume in comparison with the given sorbent, is provided. The structure of the sorbent is formed by the self-assembly during the hydration of the dry mix of the components.

According to an exemplary embodiment, the sorbent is a hydrated form of the nanocomposite polymer complex in the form of a dual polymer chain of L-chiral twist with the increased internal (Sr-selective) chelate pockets and external (Cs-selective) chelate pockets formed due to the distortion of the original structure of the calcium alginate polymer under the alkaline molecular splicing, and stabilizing in the result of the interaction with sodium alginate. The structure of the sorbent is formed by the self-assembly during the controlled hydration of the raw mixture of the components.

According to an exemplary embodiment, the raw mixture for the production of the sorbent is provided. The raw mixture is represented by the mixed (into a homogenous state) powdered samples (0.2-1.5 weight parts) of pentetic acid (diethylene triamine pentaacetic acid, DTPA), sodium alginate (0.8-1.5 weight parts) and calcium alginate (0.01-1.3 weight parts) by adding (1 to 10 weight parts) of dry potassium hydroxide. A preferred range of components would be (1 weight part) of pentetic acid (diethylene triamine pentaacetic acid, DTPA), sodium alginate (1 weight part) and calcium alginate (1 weight part) by adding (5 weight parts) of dry potassium hydroxide The structure of the sorbent is formed by the self-assembly of the raw mixture in the process of the controlled hydration. To obtain the sorbent, the raw mixture is diluted with 2-50 weight parts of water, distilled under constant stifling. Preferably, the dilution procedure should be performed at the initial pH within the range from 8 to 12 units and the temperature of 35-50° C. for 30-120 minutes. The formation of the polymer is shown by the spontaneous shift of pH to the strongly acidic range (pH between 3 and 4, preferably about 3.5).

According to the exemplary embodiment, the raw mixture itself, as well as the production of this mixture, allow for production of the sorbent with a high and specific sorption capacity under in compliance with bio-compatibility requirements with respect to various biological objects. The raw mixture has a light weight and volume in comparison to the sorbent.

The invention can be illustrated by the following examples of its particular implementation.

Example 1

Preparing the Raw Mixture for the Production of the Sorbent.

One should mix the powdered samples: 1 g of pentetic acid (diethylene triamine pentaacetic acid, DTPA) with 1 g of Na-alginate and 1 g of Ca-alginate, then add 5 g of dry KOH. The mixture of these components is stirred with a mechanical stirrer until a homogeneous state is reached.

Example 2

Producing the Sorbent.

The raw mixture obtained according to the Example 1 is diluted with 50 ml of distilled water under constant stifling. The initial pH of the hydrate form achieves 9 units and is maintained at the temperature of 40° C. for 40 minutes until the spontaneous shift of pH=3, with tight binding to the final polymer structure.

Example 3

Testing the Sorbent.

The sorbent was prepared according to Example 2. Two samples were taken: the first one contained 1.5 g of Sr nitrate, the second one contained 1.5 g of Cs nitrate. Each sample was dissolved in 3 ml of water. 2 g of the sorbent were added the each of the resulting solutions that were then incubated for 30 minutes at 15° C. After the incubation, it was observed that in each sample the sorbent completely binds to the entire volume of the solution. In case of strontium nitrate, visually the structure of the obtained gelatinous mass becomes more solid and similar to the hot semolina. In case of cesium nitrate, the mass has a more amorphous and smooth shape.

By the method of atomic adsorption spectrophotometry it was shown that 2 g of the sorbent can bind Sr-22% by weight, and Cs-25% by weight. The distribution coefficient between the sorbent and the water separated by the filtration under the pressure using a nylon filter with pore diameters of 100 microns is 1388 for Sr and 587—for Cs. This means that the sorbent has a specific sorption capacity under these conditions of 330 mg of $Sr^{2+}$ for 1 g of sorbent.

The resulting specific capacity of the sorbent is 25 times higher than that of the best modern analogue (13 mg per 1 g) (high-ordered mesoporous) HOM (1 g) from NIMS—13 mg (http:**www.nims.go.jp/eng/news/press/2011/07/p201107270.html). The created sorbent binds 3.7TBq $^{90}Sr$ (while HOM binds only 65GBq). In addition, the sorbent also binds Cs and has a sorption capacity under these conditions of 105 g $Cs^+$ for 1 g of the sorbent or $^{137}Cs$ radioactive isotope in the amount of 1.12 TBq.

Having thus described a preferred embodiment, it should be apparent to those skilled in the art that certain advantages of the described method have been achieved.

It should also be appreciated that various modifications, adaptations, and alternative embodiments thereof may be made within the scope and spirit of the present invention. The invention is further defined by the following claims.

What is claimed is:

1. A method for production of a sorbent for selective binding of Cs and Sr isotopes from liquid medium, comprising:
   producing a homogenous mixture of powdered pentetic acid, sodium alginate, calcium alginate and powdered potassium hydroxide,
   wherein the homogeneous mixture contains from 0.2 to 1.5 weight parts of pentetic acid, 0.8 to 1.5 weight parts of sodium alginate, 0.01 to 1.3 weight parts of calcium alginate and 1 to 10 weight parts of dry potassium hydroxide; and
   hydrating the homogeneous mixture and forming the sorbent for the selective binding of Cs and Sr isotopes.

2. The method of claim 1, wherein the sorbent is a polymer complex formed by the hydration of the homogeneous mixture.

3. The method of claim 1, wherein the hydration of the homogeneous mixture uses an amount of water from 2 to 50 weight parts under a constant stirring.

4. The method of claim 1, wherein the hydration of components of the homogeneous mixture is carried out at an initial pH of 8 to 12 and a temperature of 35-50° C. for 30-120 minutes until a spontaneous shift of pH to a strongly acidic range of pH 3 to 4 occurs.

* * * * *